UNITED STATES PATENT OFFICE.

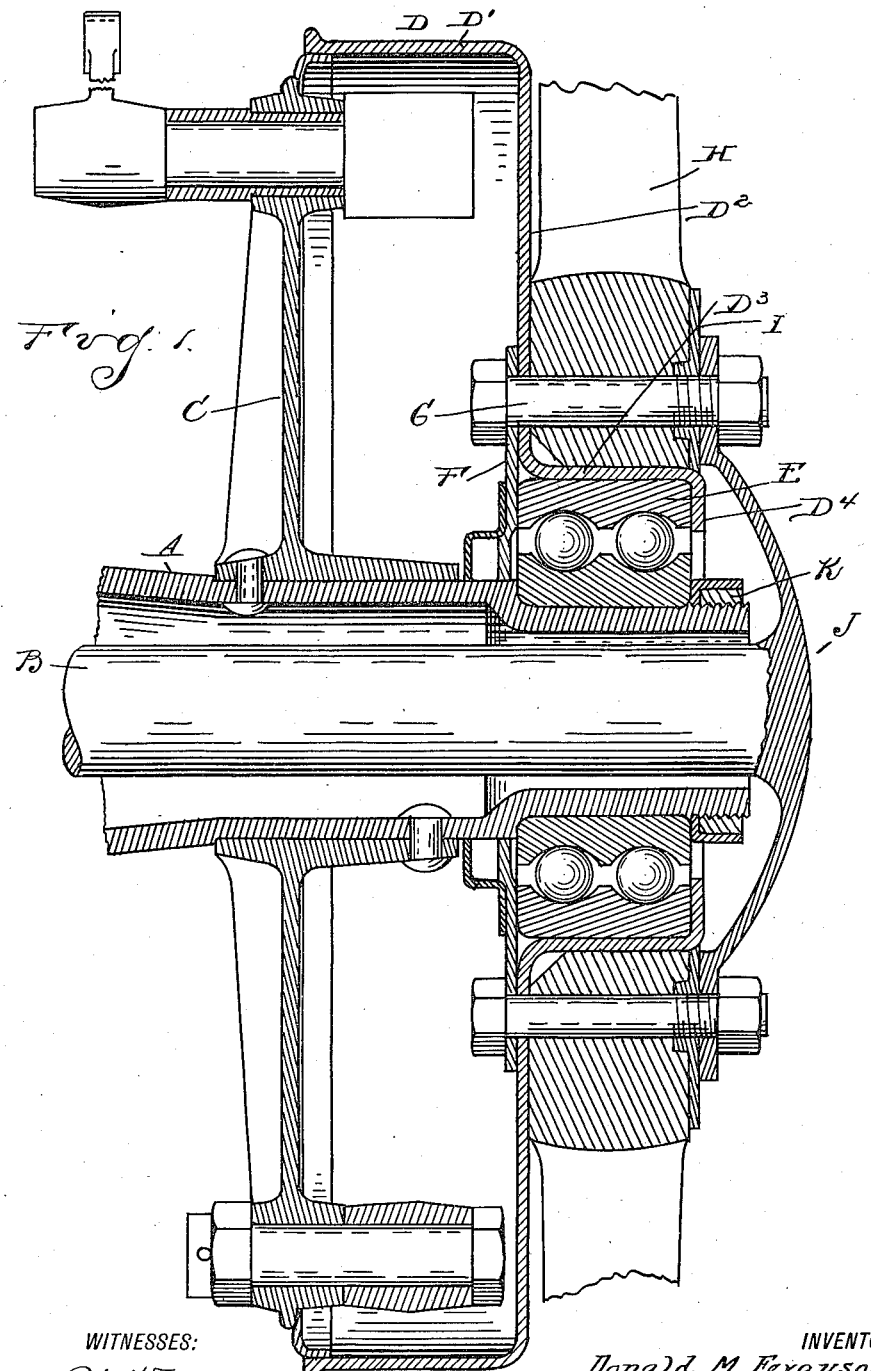

DONALD M. FERGUSON, OF DETROIT, MICHIGAN, ASSIGNOR TO GENERAL MOTORS COMPANY, OF DETROIT, MICHIGAN, A CORPORATION OF NEW JERSEY.

VEHICLE-WHEEL.

1,190,274.  Specification of Letters Patent.  Patented July 11, 1916.

Application filed June 15, 1914. Serial No. 845,288.

*To all whom it may concern:*

Be it known that I, DONALD M. FERGUSON, a citizen of the United States of America, residing at Detroit, in the county of Wayne and State of Michigan, have invented certain new and useful Improvements in Vehicle-Wheels, of which the following is a specification, reference being had therein to the accompanying drawings.

The invention relates to vehicle wheels designed for use as drivers in motor vehicles, and has more particular reference to the construction of the wheel hub and brake-drum.

In the present state of the art it is usual to form the brake-drum as an attachment to the wheel, being provided with means for securing it to the hub or to the spokes. The wheel hub is, however, distinct from the drum.

With the present invention I have formed the hub and the drum integral, and of a pressed sheet metal construction, thereby simplifying and cheapening the structure.

In the drawings: the figure is a central section through a portion of my improved wheel as attached to a vehicle drive axle.

A is the axle housing, B the drive axle therein and C is the stationary brake-head mounted upon the axle housing.

D is a combined hub and brake-drum, preferably formed of pressed steel, and having the cylindrical portion D' which constitutes the brake-drum, the web portion D² which lies adjacent to the spokes of the wheel, and the cylindrical portion D³ projecting oppositely from said web and constituting the hub.

The portion D³ forms a recess for receiving the anti-friction roller bearing E, and an inwardly-turned flange D⁴ forms a thrust shoulder for one end of this bearing. The opposite end of the bearing is secured by a circular plate F which lies adjacent to the web D² and is secured thereto by clamping bolts G, which also secure in place the spokes H, an annular outer clamping flange I and the drive-head J which is connected to the drive axle B. This drive-head J is preferably of the dished form shown, so as to provide clearance for the end of the axle housing A and nut K for clamping the bearing E against an opposed shoulder L on the housing A.

With the construction as described, the brake-drum and hub being die-fashioned are always in true concentric relation, and the apertures for the bolts G are also exactly positioned. This avoids the necessity of any machining operation, thereby cheapening the cost of manufacture while the assembling of the parts is also facilitated.

What I claim as my invention is:—

In a device of the character described, the combination with an axle, a drive shaft therein and a head at the outer end of said drive shaft for communicating the torque to the wheel, of a pressed metal member having a brake-drum, an inwardly-extending web and a cylindrical portion projecting oppositely from said web, constituting a hub; an anti-friction bearing seated in said hub upon said axle, a flange for clamping said bearing in said hub, spokes extending radially from said hub, a flange on the outer face of said spokes, and a clamping bolt for securing said bearing - clamping flange, spoke-clamping flange and torque head to each other.

In testimony whereof I affix my signature in presence of two witnesses.

DONALD M. FERGUSON.

Witnesses:
F. H. FLEMING,
E. D. WILLIAMSON.